US012515876B2

(12) United States Patent
Pollock et al.

(10) Patent No.: US 12,515,876 B2
(45) Date of Patent: Jan. 6, 2026

(54) METHODS AND SYSTEMS FOR PREVENTING CONDENSATION DURING SHIPPING

(71) Applicant: PCX Holding LLC, Clayton, NC (US)

(72) Inventors: Gary Pollock, Sims, NC (US); Jeff Donner, Colorado Springs, CO (US)

(73) Assignee: PCX Holding LLC, Shelton, CT (US)

( * ) Notice: Subject to any disclaimer, the term of this patent is extended or adjusted under 35 U.S.C. 154(b) by 0 days.

(21) Appl. No.: 16/898,642

(22) Filed: Jun. 11, 2020

(65) Prior Publication Data
US 2020/0391936 A1 Dec. 17, 2020

Related U.S. Application Data

(60) Provisional application No. 62/861,032, filed on Jun. 13, 2019.

(51) Int. Cl.
*B65D 90/38* (2006.01)
*B65D 88/74* (2006.01)
(Continued)

(52) U.S. Cl.
CPC ........... *B65D 90/38* (2013.01); *B65D 88/747* (2013.01); *B65D 90/48* (2013.01); *F24F 3/14* (2013.01);
(Continued)

(58) Field of Classification Search
CPC ...... B65D 90/38; B65D 88/747; B65D 90/48; B65D 2585/6875; B65D 88/745; B65D 2590/0083; F24F 3/14; F24F 11/30
See application file for complete search history.

(56) References Cited

U.S. PATENT DOCUMENTS 2,488,636 A * 11/1949 Mendenhall ............... F24F 3/14
                                                   392/350
2,771,987 A * 11/1956 Kennedy ................. B65D 19/44
                                                   206/521
(Continued)

FOREIGN PATENT DOCUMENTS

CN         205427677 U   *  8/2016
DE     102009051187 A1   *  1/2011
(Continued)

OTHER PUBLICATIONS

Amano et al., Compound Container, Dec. 29, 1988, WO8810222A1, Whole Document (Year: 1988).*
(Continued)

*Primary Examiner* — Larry L Furdge
(74) *Attorney, Agent, or Firm* — Ruggiero McAllister & McMahon LLC; Edward L McMahon

(57) ABSTRACT

Disclosed herein are methods, systems, and devices for preventing condensation during shipping of prefabricated electrical equipment within a plurality of enclosures. In one embodiment, the system includes a first enclosure first monitoring sensor configured to be positioned within a first enclosure of the plurality of enclosures, and a first enclosure climate control device configured to be positioned at least partially within the first enclosure. The system also includes a first enclosure primary side electrical interconnect, a first enclosure secondary side electrical interconnect, and a first enclosure controller. The first enclosure controller is coupled with the first enclosure first monitoring sensor, the first enclosure climate control device, the first enclosure primary side electrical interconnect, and first enclosure secondary side electrical interconnect.

13 Claims, 10 Drawing Sheets

(51) Int. Cl.
*B65D 90/48* (2006.01)
*F24F 3/14* (2006.01)
*F24F 11/30* (2018.01)

(52) U.S. Cl.
CPC ...... *F24F 11/30* (2018.01); *B65D 2585/6875* (2013.01); *F24F 2003/144* (2013.01)

(56) References Cited

U.S. PATENT DOCUMENTS

| | | | | |
|---|---|---|---|---|
| 5,729,058 | A * | 3/1998 | Groeller | B60D 1/64 |
| | | | | 315/77 |
| 7,738,251 | B2 * | 6/2010 | Clidaras | H05K 7/2079 |
| | | | | 454/118 |
| 2003/0127452 | A1 * | 7/2003 | Gerhardinger | B32B 17/10036 |
| | | | | 219/497 |
| 2006/0027556 | A1 * | 2/2006 | Peterson | F24C 7/105 |
| | | | | 219/386 |
| 2007/0021157 | A1 * | 1/2007 | Chen | H04L 61/106 |
| | | | | 455/556.1 |
| 2012/0013141 | A1 * | 1/2012 | Cheng | B60P 3/34 |
| | | | | 296/24.3 |
| 2013/0168456 | A1 * | 7/2013 | Zenkel | G10C 9/00 |
| | | | | 236/44 A |
| 2013/0342968 | A1 * | 12/2013 | Peterson | H05K 1/141 |
| | | | | 361/679.01 |
| 2014/0190198 | A1 * | 7/2014 | Slessman | F24F 11/30 |
| | | | | 62/314 |
| 2016/0131605 | A1 * | 5/2016 | Hamrouni | F25D 29/00 |
| | | | | 702/183 |
| 2018/0022540 | A1 * | 1/2018 | Weyna | B65D 90/48 |
| | | | | 206/459.1 |
| 2019/0164124 | A1 * | 5/2019 | Beasley | G06Q 10/0838 |
| 2019/0239367 | A1 * | 8/2019 | Elliott | H05K 7/20945 |

FOREIGN PATENT DOCUMENTS

RU 90284 U1 * 12/2009
WO WO8810222 A1 * 12/1988

OTHER PUBLICATIONS

Lars-Henric, Radiation Heating System . . . , Jan. 13, 2011, DE102009051187A1, Whole Document (Year: 2011).*
Weng et al., Carrier-bourne Electronic Equipment Container, Aug. 3, 2016, CN205427677U, Whole Document (Year: 2016).*
Bogulin et al., Device for Heating Flat Electric Heaters, Dec. 27, 2009, RU90284U1, Whole Document (Year: 2009).*

* cited by examiner

SCHEMATIC DIAGRAM 600

SCHEMATIC DIAGRAM 700

SCHEMATIC DIAGRAM 900

METHODS AND SYSTEMS FOR PREVENTING CONDENSATION DURING SHIPPING

CROSS-REFERENCE TO RELATED APPLICATION

This application claims the benefit of U.S. Provisional Patent Application No. 62/861,032, filed on Jun. 13, 2019, the entire content of which is incorporated herein by reference.

TECHNICAL FIELD

The present invention relates generally to shipping/transportation of electrical equipment in one or more prefabricated or manufactured configurations and more specifically to prevent condensation during the shipping/transportation process.

BACKGROUND

Modular electrical systems can be prefabricated or manufactured at the factory with various pieces of electrical equipment installed. For example a prefabricated electrical distribution center (EDC), a modular data center (MDC), an integrated power skid, an integrated switchboard, a switchboard section or cubicle or the like may be built at a factory having a very different climate than the climate during transportation or its final destination. Prior to shipment, these modular electrical systems are often wrapped in a plastic wrap materials similar to boat wrap or shrink wrap. After being wrapped, the modular electrical systems can be further protected by being encased in a wood or composite structure. The wood or composite structure serves to protect the electrical systems against weather and other foreign elements as they travel down the road or by boat or train to their final destination. Protected as these electrical systems are, they are still exposed to a variety of temperature and humidity changes during transportation. As such these temperature and humidity changes may cause condensation on the internally housed electrical components.

Accordingly, a need exists for systems and methods for preventing condensation in prefabricated or manufactured electrical equipment systems or components during shipping/transportation from factory to customer site. The totality of the wrapped prefabricated or manufactured electrical equipment systems and components referenced above shall hereafter be referred to as "enclosures".

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein are methods, systems, and devices for preventing condensation during shipping of prefabricated electrical equipment within a plurality of enclosures. In one embodiment, the system includes a first enclosure first monitoring sensor configured to be positioned within a first enclosure of the plurality of enclosures, and a first enclosure climate control device configured to be positioned at least partially within the first enclosure. The system also includes a first enclosure primary side electrical interconnect, a first enclosure secondary side electrical interconnect, and a first enclosure controller. The first enclosure controller is coupled with the first enclosure first monitoring sensor, the first enclosure climate control device, the first enclosure primary side electrical interconnect, and first enclosure secondary side electrical interconnect.

In some embodiments, the plurality of enclosures may be embedded within a prefabricated electrical distribution center (EDC), a modular data center (MDC), an integrated power skid, an integrated switchboard, or the like. The plurality of enclosures may be a skid mounted system configured to be positioned on a semi-trailer for shipping. The plurality of enclosures may also be configured to be protected during shipping using a shrink wrap system.

In some embodiments, the first enclosure climate control device may be a space heater, dehumidifier, a heat pump, or the like. The first enclosure first monitoring sensor may be an electronic hygrostat or the like. The first enclosure primary side electrical interconnect may be configured to be electrically coupled with a power source. The power source may be a portable generator, a battery source, a portable solar source, a portable wind turbine source, or the like. In other embodiments, the power source may be an auxiliary jumper cable receptacle. The auxiliary jumper cable receptacle may be configured to provide either approximately 12 volts direct current (DC) or approximately 24 volts DC. The auxiliary jumper cable receptacle may be compliant to Society of Automotive Engineers (SAE) standard J560_201604 and SAE standard J3082_201511. In some embodiments, the system may include a first battery configured to provide power to the first enclosure climate control device.

The first enclosure controller may be configured to receive first enclosure climate information from the first enclosure first monitoring sensor and the first enclosure climate information may include ambient temperature data and ambient humidity data. The first enclosure controller may be further configured to regulate the first enclosure climate control device based at least partially on the first enclosure climate information. The first enclosure controller may be further configured to receive external climate information and further regulate the first enclosure climate control device based at least partially on the external climate information.

In some embodiments, the external climate information may be received from an external ambient monitoring sensor or may be received from a geographic information system (GIS) weather forecasting source. In certain embodiments, GIS the weather forecasting source may be the National Oceanic and Atmospheric Administration (NOAA) National Weather Service, Meteorological Simulation Data Ingest System (MADIS), Esri Open Data Portal, or the like. The first enclosure controller may be further configured to receive Global Positioning System (GPS) location information and may further regulate the first enclosure climate control device based at least partially on the GPS location information.

The system may also include a first enclosure second monitoring sensor coupled with the first enclosure controller. The first enclosure second monitoring sensor may be configured to be directly mechanically coupled to an electrical component within the first enclosure and the first enclosure controller may be further configured to receive electronic component temperature information from the first enclosure second monitoring sensor and further regulate the first enclosure climate control device based at least partially on the electronic component temperature information. In certain embodiments, the electrical component may be a bus bar that includes copper.

The first enclosure second monitoring sensor may be wirelessly coupled with the first enclosure controller using a wireless communication protocol. The wireless communication protocol may be a Wi-Fi communication protocol, a ZigBee communication protocol, a Bluetooth communication protocol, a Bluetooth Low Energy (BLE) communication protocol, a Z-wave communication protocol, or the like. Additionally, the first enclosure first monitoring sensor may also be wirelessly coupled with the first enclosure controller using a wireless communication protocol.

The first enclosure controller may be further configured to provide first enclosure control information via the first enclosure primary side electrical interconnect. The first enclosure control information may include a request to start the portable generator. The first enclosure controller may be further configured to provide alarm information based on the first enclosure climate information and an estimated dew point within the first enclosure. The alarm information may be provided by a wireless interface. The wireless interface may be a 2G cellular interface, a 3G cellular interface, a 4G cellular interface, a 5G cellular interface, or the like.

The system may include a second enclosure first monitoring sensor configured to be positioned within a second enclosure of the plurality of enclosures and a second enclosure climate control device configured to be positioned at least partially within the second enclosure. The system may also include a second enclosure primary side electrical interconnect, a second enclosure secondary side electrical interconnect, and a second enclosure controller. The second enclosure controller may be coupled with the second enclosure first monitoring sensor, the second enclosure climate control device, the second enclosure primary side electrical interconnect, and second enclosure secondary side electrical interconnect. The first enclosure secondary side electrical interconnect may be configured to be electrically coupled with the second enclosure primary side electrical interconnect. In some embodiments the system may include a second battery configured to provide power to the second enclosure climate control device.

Additionally, the system may include a third enclosure first monitoring sensor configured to be positioned within a third enclosure of the plurality of enclosures and a third enclosure climate control device may be configured to be positioned at least partially within the third enclosure. The system may also include a third enclosure primary side electrical interconnect, a third enclosure secondary side electrical interconnect, and a third enclosure controller. The third enclosure controller may be coupled with the third enclosure first monitoring sensor, the third enclosure climate control device, the third enclosure primary side electrical interconnect, and the third enclosure secondary side electrical interconnect. The third enclosure primary side electrical interconnect may be configured to be electrically coupled with the second enclosure secondary side electrical interconnect. In some embodiments the system may include a third battery configured to provide power to the third enclosure climate control device.

In another embodiment, a method is disclosed for preparing a plurality of enclosures of a prefabricated or manufactured electrical equipment system to prevent condensation during shipment. The method includes installing a first enclosure first monitoring sensor within a first enclosure of the plurality of enclosures, installing a first enclosure climate control device positioned at least partially within the first enclosure. The method further includes installing a first enclosure controller. The first enclosure controller is coupled with the first enclosure first monitoring sensor, the first enclosure climate control device, a first enclosure primary side electrical interconnect, and an enclosure secondary side electrical interconnect.

In this embodiment, the plurality of enclosures may be embedded within a prefabricated electrical distribution center (EDC), a modular data center (MDC), an integrated power skid, an integrated switchboard, or the like. The plurality of enclosures may be a skid mounted system configured to be positioned on a semi-trailer for shipping. The plurality of enclosures may also be configured to be protected during shipping using a shrink wrap system.

In this embodiment, the first enclosure climate control device may be a space heater, a dehumidifier, a heat pump, or the like. The first enclosure first monitoring sensor may be an electronic hygrostat or the like. The first enclosure primary side electrical interconnect may be configured to be electrically coupled with a power source.

BRIEF DESCRIPTION OF THE DRAWINGS

The present embodiments are illustrated by way of example and are not intended to be limited by the figures of the accompanying drawings. In the drawings.

DETAILED DESCRIPTION

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Disclosed herein are methods, systems, and devices for preventing condensation during shipping of prefabricated or manufactured electrical equipment systems or components within multiple enclosures during transportation from the factory to customer sites. Ambient temperature, dew point, humidity levels, and condensation formation within the enclosures are of particular concern during transportation. If condensation forms on integral parts of the electrical equipment and remains on the metal surface for long periods of time, an environment that could foster corrosion on both the electrical equipment and the enclosures is created. Formation of condensation occurs when cool surfaces (e.g. cooler than the local dew point) come into contact with hot, humid air or when hot surfaces come into contact with cool, saturated air. The dew point, or the temperature below which water droplets begin to form, needs to be monitored such that condensation does not begin to form. Temperature levels and humidity should also be measured constantly since each effect dew point.

Methods, devices, and systems disclosed herein help prevent condensation formation by monitoring and maintaining relative temperature and humidity levels inside the electrical gear relative to a calculated dew point. Other known solutions that are designed for and employed during shipping/transportation include the use of desiccants. Desiccants have a finite capacity to hold moisture and do not prevent the conditions under which condensation occurs (surface temperatures below the dew point). Desiccant can work effectively in a small closed/controlled volume at reducing moisture content but it cannot prevent condensation. Our method actively maintains temperature above the dew point effectively preventing condensation from occurring.

Figure 1:
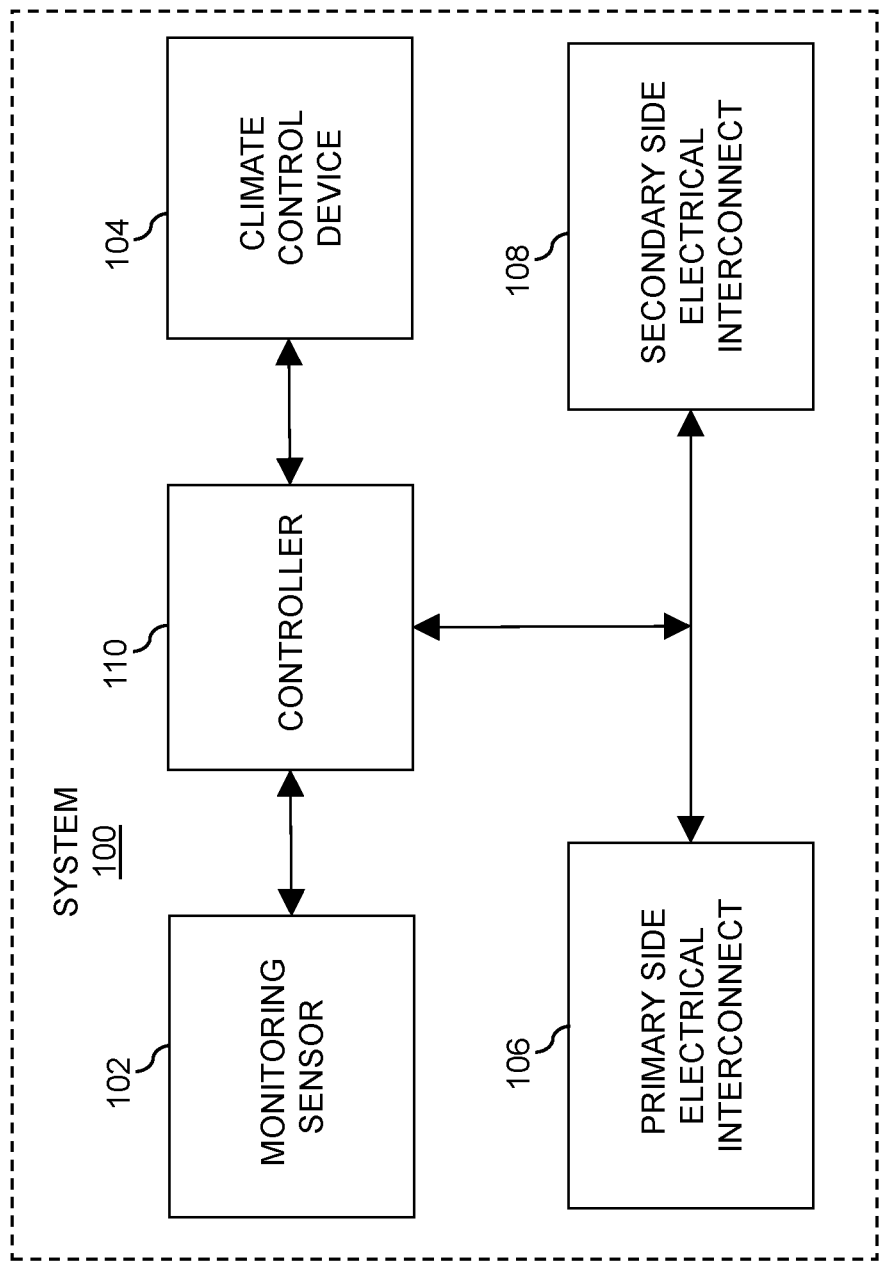
FIG. 1 depicts a block diagram illustrating a system for preventing condensation during shipping/transportation of prefabricated or manufactured electrical equipment systems or components within a plurality of enclosures in accordance with embodiments of the present disclosure.

FIG. 1 depicts a block diagram illustrating a system 100 for preventing condensation during shipping/transportation of prefabricated or manufactured electrical equipment systems or components within a plurality of enclosures. The system 100 includes a monitoring sensor 102, a climate control device 104, a primary side electrical interconnect 106, a secondary side electrical interconnect 108, and a controller 110.

The monitoring sensor 102 may be an electronic hygrostat or any device that measures temperature and humidity. The monitoring sensor 102 may also include multiple sensors, such as multiple hygrostats, thermometers, and hygrometers. The climate control device 104 may be a space heater, dehumidifier, a heat pump, or any device that may be electrically configured to reduce humidity or raise temperature within an enclosure to avoid condensation. The climate control device 104 may also include multiple devices such as multiple space heaters, dehumidifiers, and heat pumps. The primary side electrical interconnect 106 is configured to receive power from a power source and electrically power all components of the system 100. The secondary side electrical interconnect is configured to provide power to another system 100 via the power received from the primary side electrical interconnect 106.

The monitoring sensor 102 may be electrically coupled with the controller 110 or may be wirelessly coupled with the controller 110 using a wireless communication protocol. For example, the wireless communication protocol may be a Wi-Fi communication protocol, a ZigBee communication protocol, a Bluetooth communication protocol, a Bluetooth Low Energy (BLE) communication protocol, a Z-wave communication protocol, or a proprietary wireless protocol. As discussed previously the monitoring sensor may include multiple sensors. For example a first sensor may be a hygrostat configured to monitor ambient air and a second sensor may be a thermometer configured to be directly mechanically coupled to an electrical component. The electrical component may be a bus bar having a large thermal mass. By monitoring both ambient air and components with large thermals masses (i.e. enclosure climate information), the controller 110 may better regulate the climate control device 104 to prevent condensation on such large thermal mass components. The controller 110 may log the enclosure climate information including timestamps for later review after a shipment is completed. The enclosure climate information may be stored resident on the controller 110 or be written to a removable non-volatile memory device (e.g. USB drive, or the like) attached to the controller 110.

The controller 110 may regulate the climate control device 104 by turning power on and off to the device. In other embodiments, the controller 110 may use one or more control signals to regulate the climate control device 104. For example the controller 110 may use a remote thermostat interface. In some embodiments the remote thermostat interface may be a wireless interface using a wireless protocol. For example, the wireless communication protocol may be a Wi-Fi communication protocol, a ZigBee communication protocol, a Bluetooth communication protocol, a Bluetooth Low Energy (BLE) communication protocol, a Z-wave communication protocol, or a proprietary wireless protocol.

The controller 110 may be an internet-of-things (IoT) device having a processor, memory with program instructions, and multiple wireless interfaces. For example, a wireless uplink interface may be provided to communicate with a centralized system of the shipper and/or factory. The wireless uplink interface may be a 2G cellular interface, a 3G cellular interface, a 4G cellular interface, a 5G cellular interface, or the like. The controller 110 may be configured to receive external climate information including external temperature and external humidity. The external climate information may be received from one or more external ambient monitoring sensors. The external climate information may also be received from a geographic information system (GIS) weather forecasting source. The GIS the weather forecasting source may be the National Oceanic and Atmospheric Administration (NOAA) National Weather Service, the Meteorological Simulation Data Ingest System (MADIS), the Esri Open Data Portal, or the like. The controller 110 may also include Global Positioning System (GPS) receiver and be further configured to determine its location. The controller 110 may also log GPS data with the enclosure climate information including timestamps. In certain embodiments, the controller may transmit the enclosure climate information and/or GPS data via the wireless uplink interface to a central monitoring facility.

In some embodiments, the monitoring sensor 102 and the controller 110 may be embedded within one device. In other embodiments, the controller 110 and the climate control device 104 may be embedded within one device. In still other embodiments, the monitoring sensor 102 and the climate control device 104 may be embedded within one device. Additionally, the monitoring sensor 102, the climate control device 104, and the controller 110 may all be embedded in one device.

Figure 2:
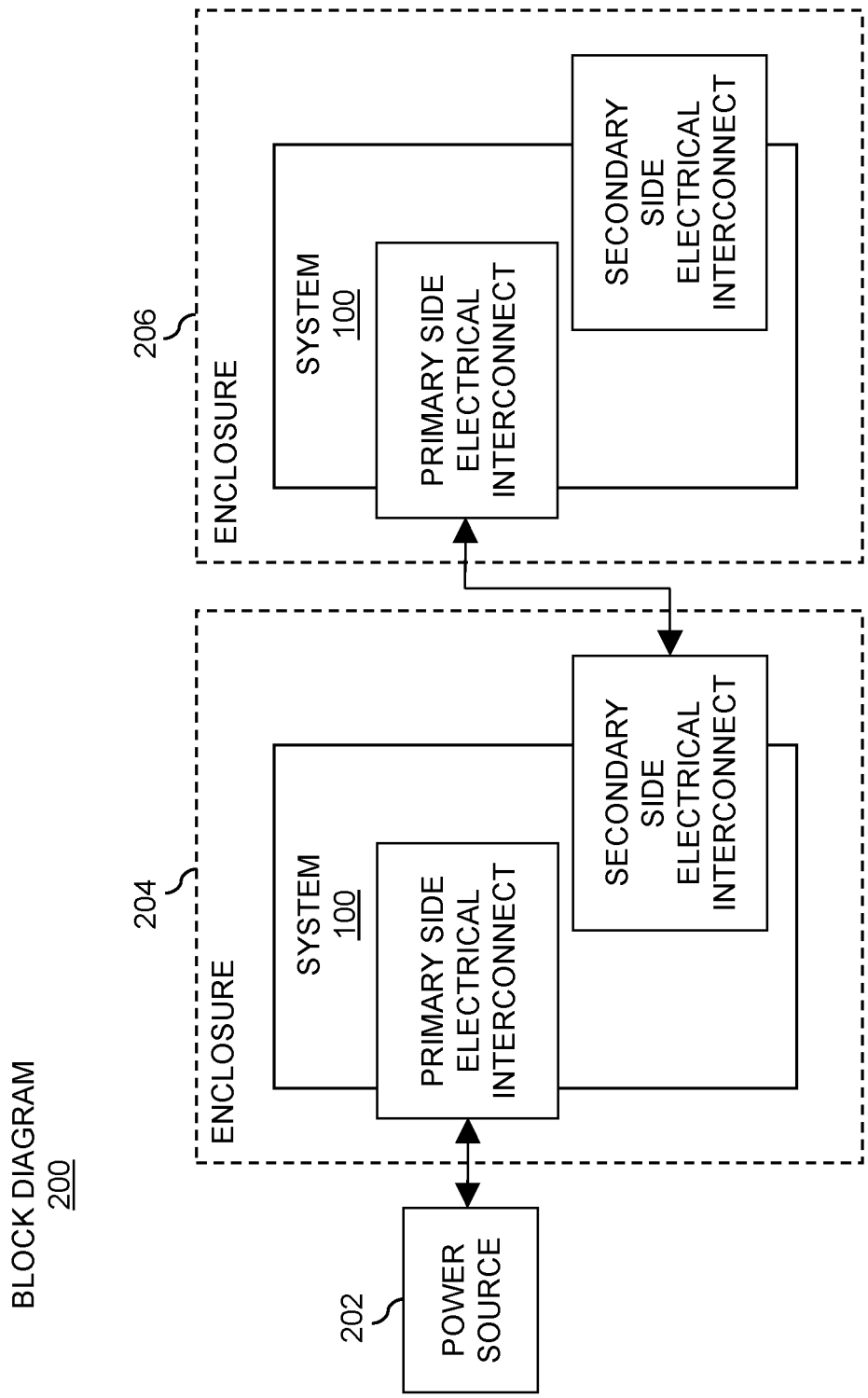
FIG. 2 depicts a block diagram including a power source, and a first enclosure, and a second enclosure in accordance with embodiments of the present disclosure.

FIG. 2 depicts a block diagram 200 including a power source 202, a first enclosure 204, and a second enclosure 206. A first system 100 is positioned within the first enclosure 204 and a second system 100 is positioned within the second enclosure 206. The power source 202 is electrically coupled to the primary side electrical interconnect of the first system 100. The secondary side electrical interconnect of the first system 100 is electrically coupled with the primary side electrical interconnect of the second system 100. One or more additional enclosures (not shown in FIG. 2) may be supported in a similar fashion with further linear cascading from the secondary side electrical interconnect of the second system 100. In other embodiments direct coupling of the primary side electrical interconnects to the power source 202 may be implemented (not shown in FIG. 2)

The power source 202 is typically positioned outside of the plurality of enclosures and the plurality of enclosures may be positioned on or within in a prefabricated electrical distribution center (EDC). The prefabricated EDC s may be a skid mounted system configured to be positioned on a semi-trailer for shipping. The EDC may also be configured to be protected during shipping using a shrink wrap system. In other embodiments, the plurality of enclosures may be positioned on or within a modular data center (MDC), an integrated power skid, and an integrated switchboard, or the like.

The power source 202 may be a portable generator. The portable generator may be powered by gasoline, diesel fuel, or propane. The portable generator may also be a 120 volt alternating current (AC) and/or 240 volt AC generator operating at approximately 60 Hertz (Hz). In other embodiments, the power source 202 may be a battery source, a portable solar panel source, a portable wind turbine source, or the like. In still other embodiments, the power source may be an auxiliary jumper cable receptacle associate with auxiliary power for a semi-trailer. The auxiliary jumper cable receptacle may be configured to provide either approximately 12 volts direct current (DC) or approximately 24 volts DC. The auxiliary jumper cable receptacle may be compliant to Society of Automotive Engineers (SAE) standard J560_201604 and SAE standard J3082_201511. One or more batteries (not shown in FIG. 2) may be deployed along the linear cascade to reduce DC voltage drops and handle power surges as one or more climate control devices are turned on.

Figure 3:
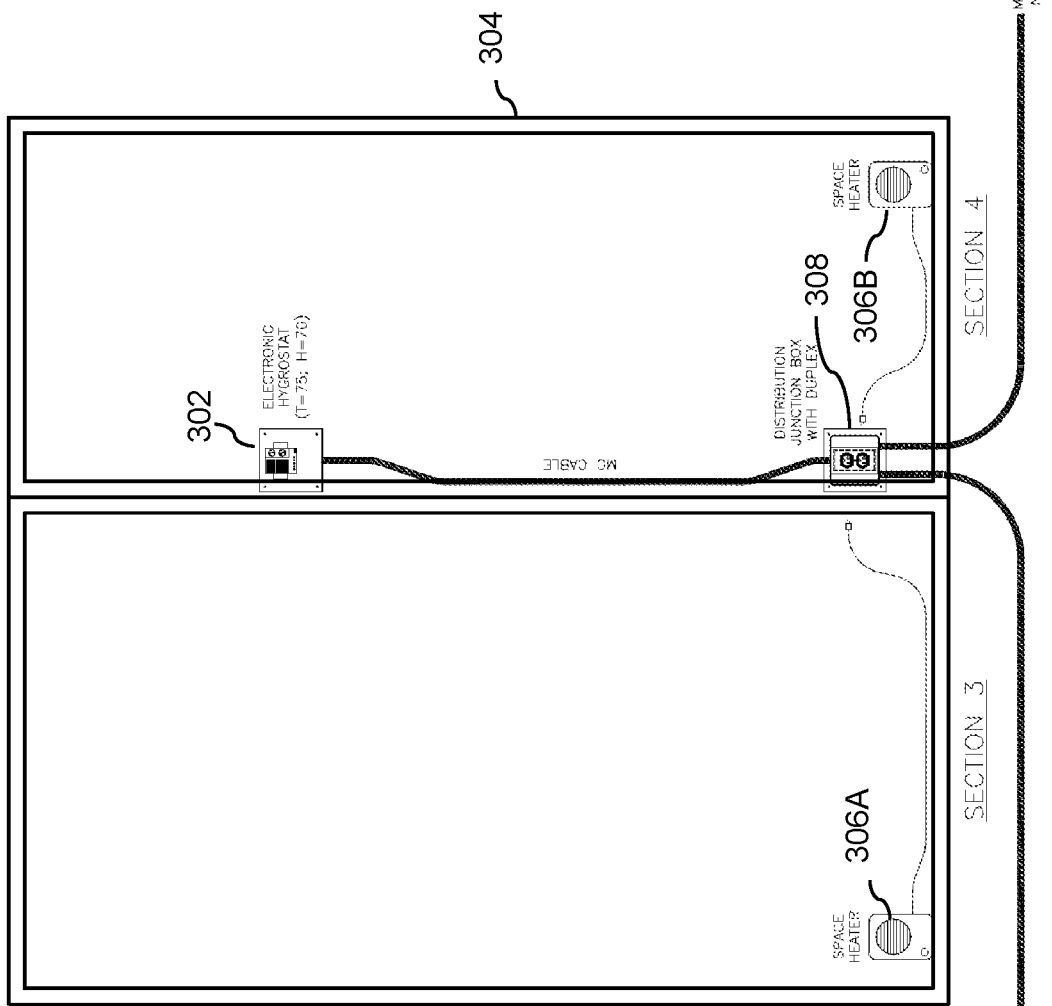
FIG. 3 depicts a mechanical diagram of one embodiment of the system of FIG. 1 illustrating one enclosure of a prefabricated a prefabricated electrical distribution center (EDC) in accordance with embodiments of the present disclosure.

FIG. 3 depicts a mechanical diagram 300 of one embodiment of the system 100 illustrating one enclosure of a prefabricated EDC. An electronic hygrostat 302 is positioned internal to an enclosure 304 approximately five feet above a floor. The electronic hygrostat 302 provides both the monitoring sensor 102 and the controller 110 of FIG. 1. Two 200 watt space heaters provide the climate control device 104 of FIG. 1. The two 200 watt space heaters 306A and 306B are positioned within two sections (i.e. sections 3 and section 4) of the enclosure 304. A junction box 308 provides the primary side electrical interconnect 106 and the secondary side electrical interconnect of 108 of FIG. 1. The junction box 308 also couples the space heaters 306A and 306B with the electronic hygrostat 302. Cables leaving the enclosure 304 via the junction box 308 connect the system 100 in a cascade arrangement to additional sections of the prefabricated EDC each having a system 100 configured to reduce condensation.

Figure 4:
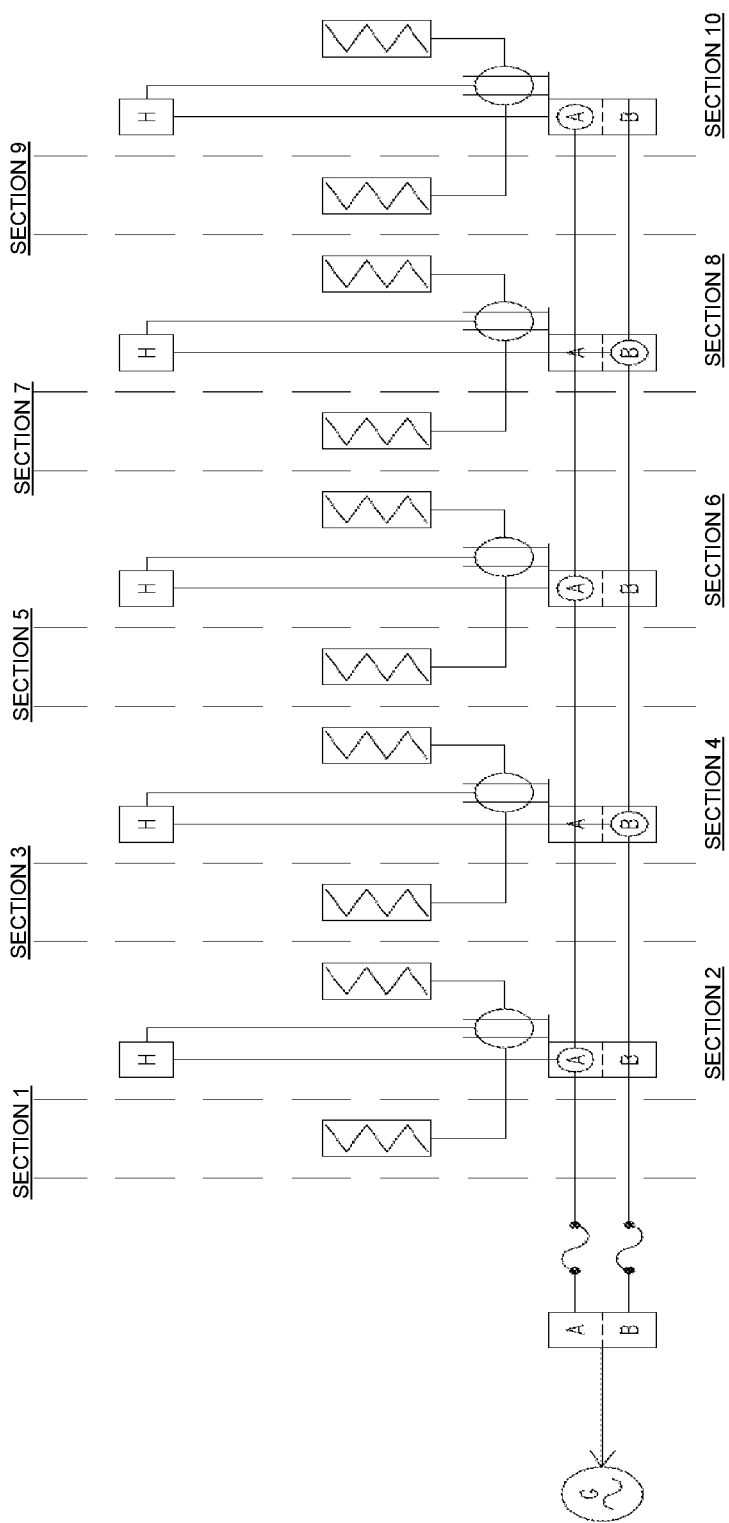
FIG. 4 depicts a simplified electrical schematic diagram illustrating five implementations of the system of FIG. 1 cascaded across ten sections of the prefabricated EDC in accordance with embodiments of the present disclosure.

FIG. 4 depicts a simplified electrical schematic diagram 400 illustrating five implementations of the system 100 of FIG. 1 cascaded across section 1 through section 10 of the prefabricated EDC. A portable generator provides the power source G to energize the space heaters and hygrostats. The portable generator is protected by fuses and/or circuit breakers to prevent a current overload situation.

The portable generator powers the junction boxes that in turn supply power to a hygrostat and one to two 200 watt space heaters per electrical enclosure and/or section. The junction boxes are internally mounted to the inside wall of the electrical enclosure (using a back-plate). The power line travels from junction box to junction box with the same layout. The 200 watt space heaters are strapped to the interior of each electrical gear enclosure at the base of the enclosure floor. The overall system is designed to be used while the prefabricated EDCs are being transported on the back of a flatbed truck. Using the heaters help to hold the local relative humidity and dew point of the air constant to prevent the water in the air from condensing. The 200 W space heaters are controlled by the installed hygrostats and the local humidity and dew point measurements. If necessary, the generator can be turned on manually to adjust the temperature and humidity levels. The system works to keep the temperature above the local dew point so that condensation does not occur and form water droplets on the bus-bar or metal components of the electrical equipment.

Figure 5:
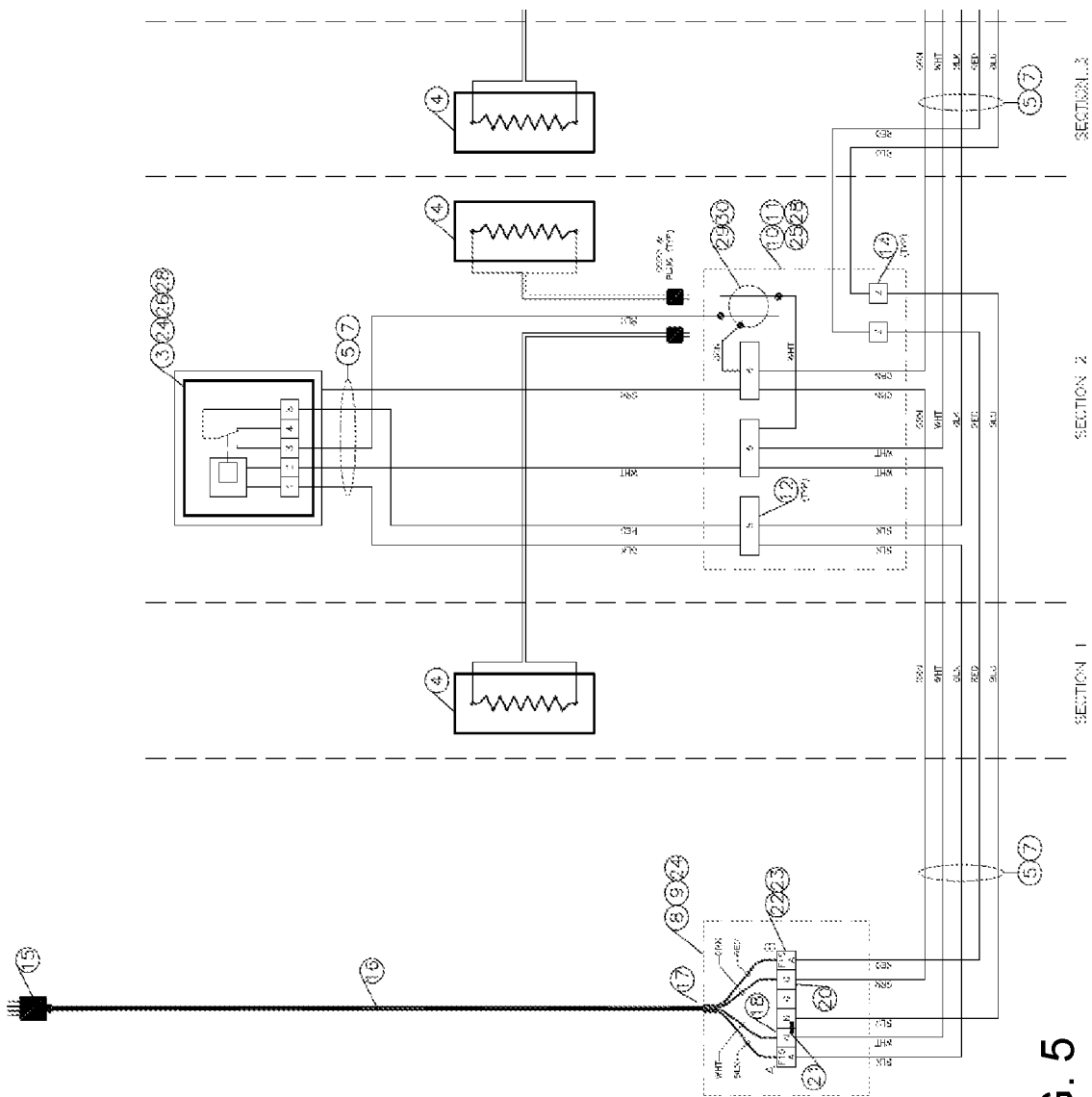
FIG. 5 depicts a more detailed schematic diagram of the system of FIG. 1 implemented across three sections of the prefabricated EDC in accordance with embodiments of the present disclosure.

FIG. 5 depicts a more detailed schematic diagram 500 of the system 100 of FIG. 1 implemented across section 1 through section 3 of the prefabricated EDC of FIG. 4 in accordance with embodiments of the present disclosure.

Figure 6:
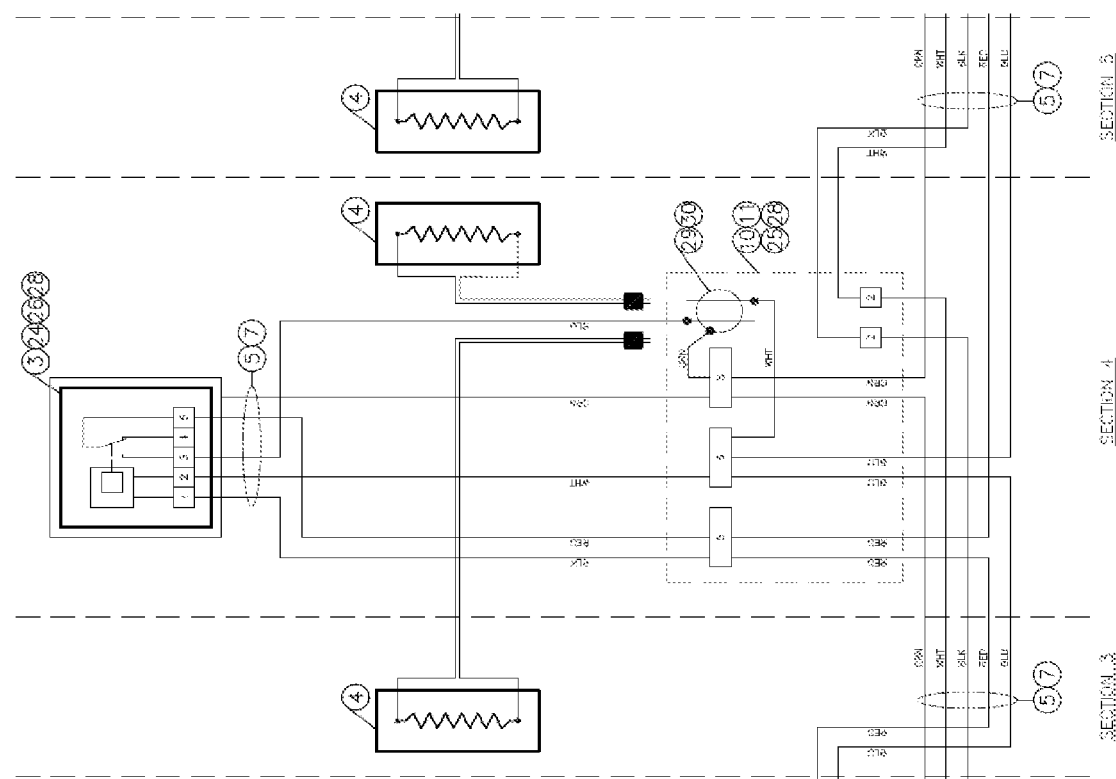
FIG. 6 depicts a more detailed schematic diagram of the system of FIG. 1 implemented across another three sections of the prefabricated EDC in accordance with embodiments of the present disclosure.

FIG. 6 depicts a more detailed schematic diagram of the system 100 of FIG. 1 implemented across section 3 through section 5 of the prefabricated EDC of FIG. 4 in accordance with embodiments of the present disclosure.

Figure 7:
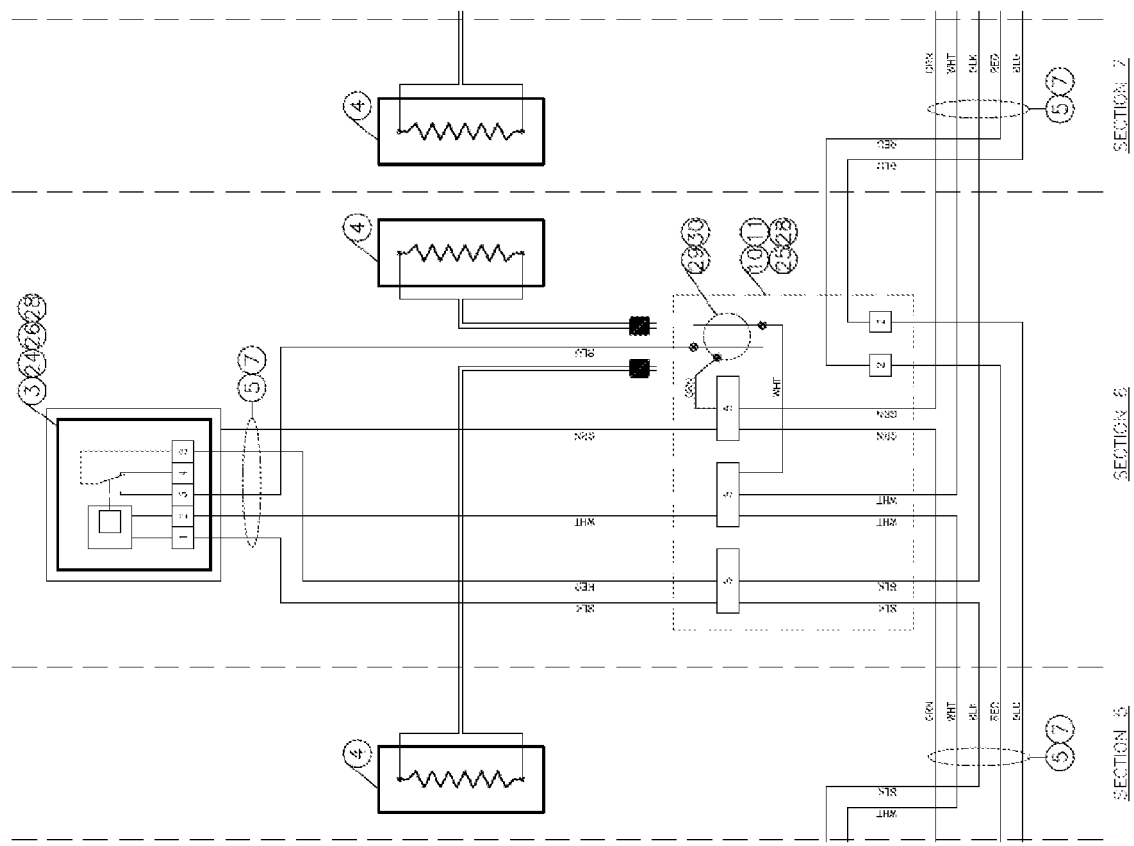
FIG. 7 depicts a more detailed schematic diagram of the system of FIG. 1 implemented across another three sections of the prefabricated EDC in accordance with embodiments of the present disclosure.

FIG. 7 depicts a more detailed schematic diagram of the system 100 of FIG. 1 implemented across section 5 through section 7 of the prefabricated EDC of FIG. 4 in accordance with embodiments of the present disclosure.

Figure 8:
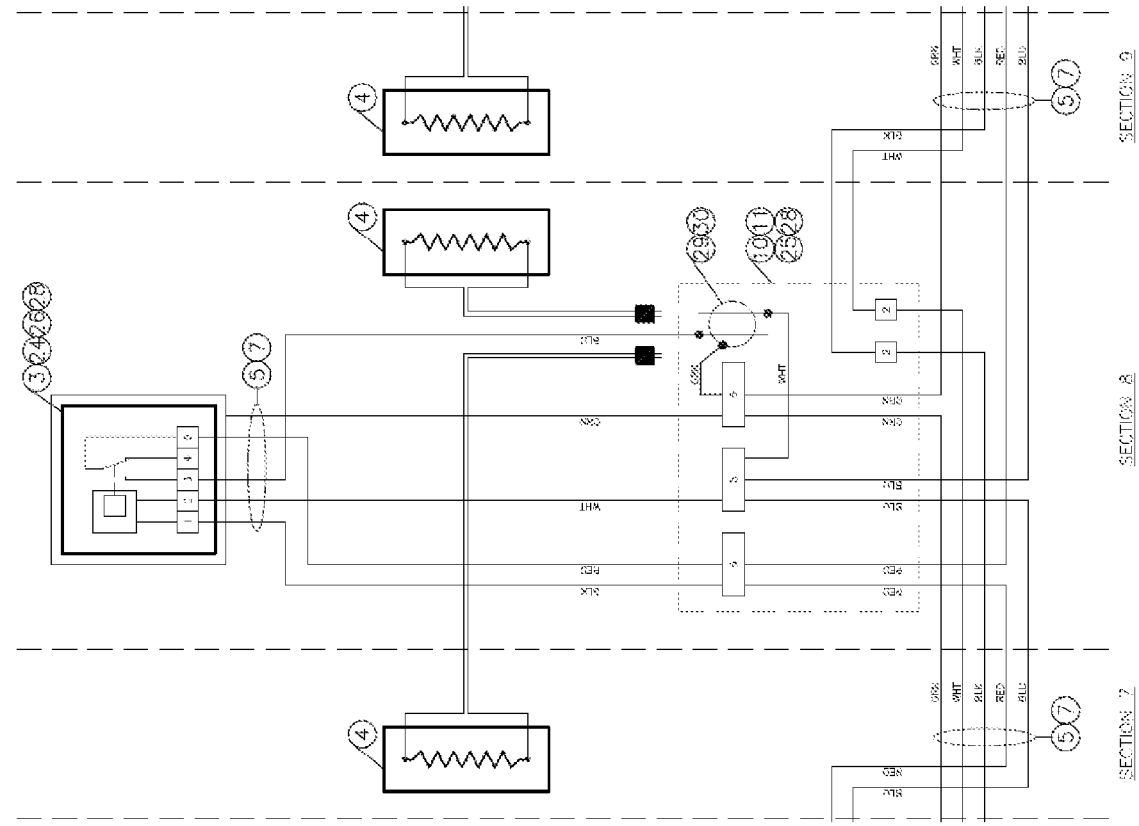
FIG. 8 depicts a more detailed schematic diagram of the system of FIG. 1 implemented across another three sections of the prefabricated EDC in accordance with embodiments of the present disclosure.

FIG. 8 depicts a more detailed schematic diagram of the system 100 of FIG. 1 implemented across section 7 through section 9 of the prefabricated EDC of FIG. 4 in accordance with embodiments of the present disclosure.

Figure 9:
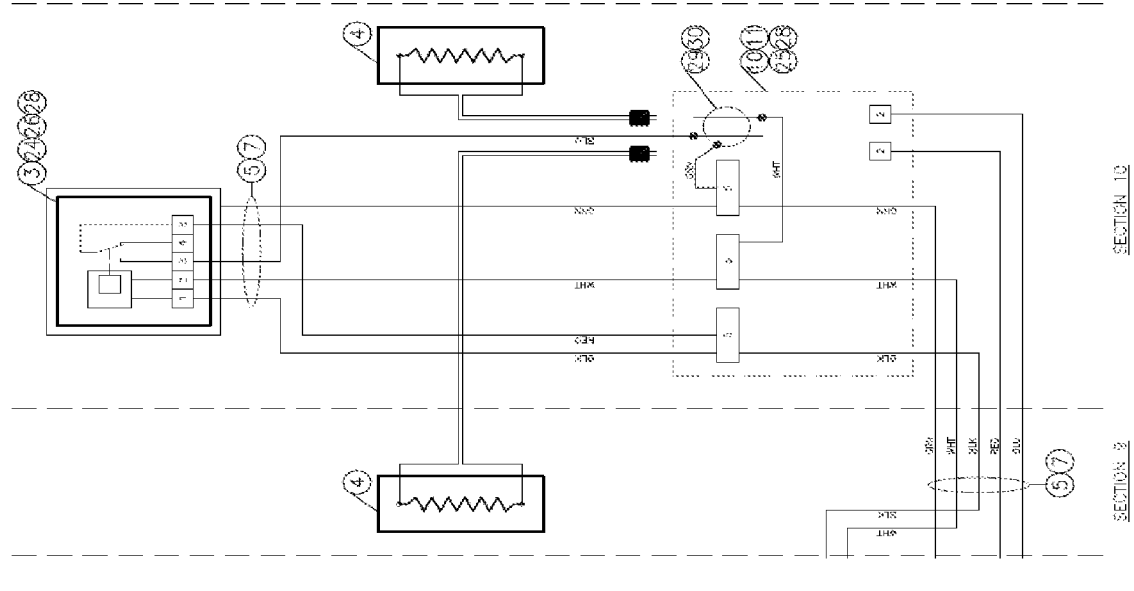
FIG. 9 depicts a more detailed schematic diagram of the system of FIG. 1 implemented across another two sections of the prefabricated EDC in accordance with embodiments of the present disclosure.

FIG. 9 depicts a more detailed schematic diagram of the system 100 of FIG. 1 implemented across section 9 and section 10 of the prefabricated EDC of FIG. 4 in accordance with embodiments of the present disclosure.

Table I depicts a parts list for the disclosed solution of FIG. 3 through FIG. 9 to reduce condensation of the prefabricated EDC during shipping/transportation.

TABLE I

PARTS LIST: MSB SKID SWITCHGEAR HEATING KIT (REC)

| ITEM | PART NUMBER | QTY | UNIT | DESCRIPTION |
|---|---|---|---|---|
| 1 | P05702 | 1 | ea. | FIRMAN 5700 W 120/240 V 30 A GAS GENERATOR |
| 2 | 48035 | 0 | ea. | CHAMPION POWER 240 V 30 A TWIST LOCK Y-ADAPTER (3 ft.) |
| 3 | 012309-00 | 5 | ea. | STEGO ELECTRONIC HYGROTHERM (120 V 10 A) |
| 4 | 100 | 10 | ea. | LASKO MY HEAT 200 W 120 V CERAMIC SPACE HEATER (6 ft. CORD & PLUG) |
| 5 | MC 12/4 | 100 | ft. | SOUTHWIRE ARMORLITE MC 4 #12 AWG CONDUCTOR + GND (D = 0.564) |
| 6 | MC 12/2 | 0 | ft. | SOUTHWIRE ARMORLITE MC 2 #12 AWG CONDUCTOR + GND (D = 0.494) |
| 7 | 5G40 | 20 | ea. | ARLINGTON SADDLEGRIP MC CABLE CONNECTOR (½") |
| 8 | ASG6X6X4NK | 1 | ea. | HOFFMANN 6" × 6" × 4" GALVANIZED SCREWCOVER BOX (NO KNOCKOUTS) |
| 9 | N/A | 1 | ea. | HOFFMANN 6" SQUARE FLAT BLANK COVER (INCLUDED) |
| 10 | 7217-1/2&3/4E | 5 | ea. | STEEL CITY 4$^{11}/_{16}$" SQUARE BOX |
| 11 | 72-C-13 | 5 | ea. | STEEL CITY 4$^{11}/_{16}$" SQUARE + ½" RAISED DEVICE COVER |
| 12 | 222-412 | 15 | ea. | WAGO 2-WIRE LEVER NUT |
| 13 | 222-413 | 0 | ea. | WAGO 3-WIRE LEVER NUT |
| 14 | 222-415 | 10 | ea. | WAGO 5-WIRE LEVER NUT |
| 15 | HBL2711 | 1 | ea. | HUBBELL NEMA L14-30P 125/250 V 30 A 3-POLE 4-WIRE LOCKING PLUG |
| 16 | EZK63 | 15 | ft. | CAROL 4-CONDUCTOR COPPER 10 AWG SOOW PORTABLE CORD |
| 17 | TB2525 | 1 | ea. | T&B STRAIN RELIEF CORD GRIP CONNECTOR (D: 0.625"-0.750") |
| 18 | WDU 6 | 2 | ea. | WEIDMULLER 36 A FEED-THRU TERMINAL BLOCK |
| 19 | WEW 35/2 | 2 | ea. | WEIDMULLER END BRACKET |
| 20 | WPE 6 | 2 | ea. | WEIDMULLER PE TERMINAL BLOCK |
| 21 | WQV 6/10 | 1 | ea. | WEIDMULLER TERMINAL CROSS-OVER (COMB JUMPER) |
| 22 | USCC1 | 2 | ea. | FERRAZ SHAWMUT 600 V CLASS CC FUSE HOLDER |
| 23 | LP-CC-15 | 2 | ea. | BUSSMANN 600 V 15 A LOW-PEAK CC TIME-DELAY FUSE |
| 24 | 6CUR2 | 24 | in. | SE 35 mm DIN RAIL |
| 25 | PCX 6X6MP | 5 | ea. | PCX 6" MOUNTING PLATE |
| 26 | PCX 6X6MPMCT | 5 | ea. | PCX 6" MOUNTING PLATE WITH MC TERMINAL (½") |
| 27 | PCX 12X6MPMCT | 0 | ea. | PCX 12" MOUNTING PLATE WITH MC TERMINAL (½") |
| 28 | 10800 | 20 | ea. | FASTENAL ¼"-20½" SELF-TAPPING SCREW |
| 29 | CR15W | 5 | ea. | LEGRAND 15 A, 125 V DUPLEX RECEPTACLE |
| 30 | 58-C-7 | 5 | ea. | STEEL CITY 4" × 2⅛" SINGLE RECEPTACLE COVER |

Figure 10:
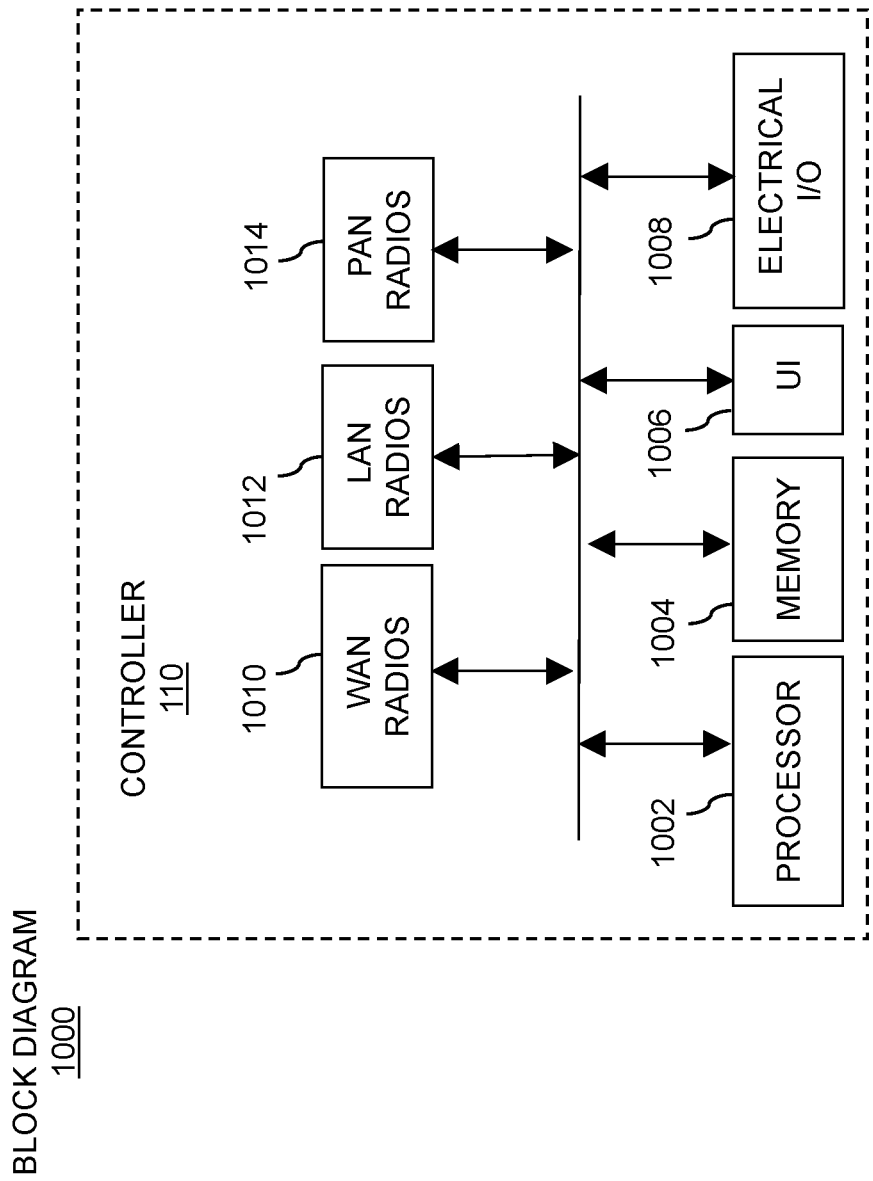
FIG. 10 depicts a block diagram of one embodiment of a controller used in the system of FIG. 1 in accordance with embodiments of the present disclosure.

FIG. 10 depicts a block diagram 1000 of one embodiment of the controller 110 used in the system 100 of FIG. 1. The controller 110 may include at least a processor 1002, a memory 1004, a user interface (UI) 1006, electrical inputs/outputs (I/O) 1008, WAN radios 1010, LAN radios 1012, and PAN radios 1014. In some embodiments, the controller 110 may be a mobile terminal including an Android® type operating system (OS), an embedded Linux (eLinux), or the like.

In some embodiments, the processor 1002 may be a mobile processor such as the Qualcomm® Snapdragon™ mobile processor. The memory 1004 may include a combination of volatile memory (e.g. random access memory) and non-volatile memory (e.g. flash memory). The memory 1004 may be partially integrated with the processor 1002. The UI 1006 may be a touchpad display, or the like. The electrical I/O 1008 may provide one or more connections to the monitoring sensor 102, the climate control device 104, the primary side electrical interconnect 106, and/or the secondary side electrical interconnect 108 of FIG. 1. The WAN radios 1010 may include 2G, 3G, 4G, 5G, or the like technologies. The WAN radios 1010 may be configured to communicate with the centralized system of the shipper and/or factory. The LAN radios 1012 may include Wi-Fi technologies such as 802.11a, 802.11b/g/n, 802.11ac, 802.11.ax, or the like circuitry. The LAN radios 1012 may be configured to communicate with other controllers associated with a given shipment and/or a mobile device associated with a driver of the given shipment. The PAN radios 1014 may include Bluetooth® technologies. The PAN radios 1014 may be configured to communicate with an external UI not shown in FIG. 10.

The various techniques described herein may be implemented with hardware or software or, where appropriate, with a combination of both. Thus, the methods, devices, and systems of the disclosed embodiments, or certain aspects or portions thereof, may take the form of program code (i.e., program instructions) embodied in tangible media forming a machine-readable storage medium, wherein, when the program code is loaded into and executed by a machine, such as a computer including a processor, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods, devices, and systems may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method of preparing a plurality of enclosures to prevent condensation within the plurality of enclosures during shipment, the method comprising:
   installing a first enclosure first monitoring sensor within a first enclosure of the plurality of enclosures;
   installing a first enclosure climate control device positioned at least partially within the first enclosure;
   installing a second enclosure climate control device positioned at least partially within a second enclosure of the plurality of enclosures;
   installing a junction box positioned within the first enclosure, the first and second climate control devices being coupled to the junction box; and
   installing a first enclosure controller, wherein the first enclosure controller is coupled with the first enclosure first monitoring sensor and the junction box, wherein:
   the plurality of enclosures is implemented within a prefabricated electrical equipment system or a manufactured electrical system;
   the first enclosure first monitoring sensor is configured to provide first enclosure climate information including ambient temperature data and ambient humidity data of the first enclosure; and
   the first enclosure controller controlling the first and second enclosure climate control devices to maintain an ambient temperature above an estimated dew point within the first and second enclosures based on the ambient temperature data and ambient humidity data of the first enclosure.

2. A system for preventing condensation during shipping of a modular electrical system, the system comprising:
   an enclosure having a first section and a second section, the enclosure having a wall separating the first and second sections, the first and second sections defining at least a portion of the modular electrical system;
   a first climate control device in the first section, the first climate control device being configured to modify the climate of the first section to prevent condensation from forming in the portion of the modular electrical system received therein;
   a second climate control device in the second section, the second climate control device being configured to modify the climate of the second section to prevent condensation from forming in the portion of the modular electrical system received therein;
   a measuring device positioned on the wall and internal to the first section, the measuring device being configured to measure temperature and humidity in the first section;
   an electrical interconnect in the first section, the electrical interconnect being configured to supply power from a power source to the first and second climate control devices;
   a controller operatively connected with the measuring device and the electrical interconnect,
   wherein the controller is configured to control the first and second climate control devices based, at least in part, on the temperature and humidity of the first section as measured by the measuring device.

3. The system of claim 2, wherein the modular electrical system is selected from a group consisting of a prefabricated electrical distribution center (EDC), a modular data center (MDC), an integrated power skid, an integrated switchboard, a switchboard section, and combinations thereof.

4. The system of claim 2, wherein the first and second climate control devices are selected from a group consisting of a space heater, a dehumidifier, a heat pump, and any combinations thereof.

5. The system of claim 2, wherein the first and second climate control devices are configured to maintain a temperature in the first and second sections, respectively, above an estimated dew point based on the temperature and the humidity in the first section as measured by the measuring device.

6. The system of claim 2, further comprising a shrink wrap wrapping the enclosure.

7. The system of claim 2, wherein the electrical interconnect is operatively connected with the power source, which is selected from the group consisting of a portable generator, a battery source, a portable solar source, a portable wind turbine source, and any combinations thereof.

8. The system of claim 2, wherein the controller is configured to log and timestamp the temperature and humidity from the measuring device.

9. The system of claim 2, wherein the controller is configured to receive, from a wired and/or wireless interface, climate information related to external climate information related to ambient conditions external to the enclosure.

10. The system of claim 9, wherein the controller is configured to receive, from a wired and/or wireless interface, the external climate information from a sensor on an exterior of the enclosure, from a geographic information system (GIS) weather forecasting source, from a Global Positioning System (GPS), and any combination thereof.

11. The system of claim 10, wherein the controller is configured to supply power from the electrical interconnect to the first and second climate control devices based, at least in part, on the external climate conditions.

12. The system of claim 2, wherein the controller is configured to transmit enclosure climate information via a wireless uplink interface to a central monitoring facility.

13. A system for preventing condensation during shipping of a modular electrical system, the system comprising:
   an enclosure having a first section and a second section, the enclosure having a wall separating the first and second sections, the first and second sections defining at least a portion of the modular electrical system;
   a first space heater in the first section, the first space heater being configured to modify the climate of the first section;
   a second space heater in the second section, the space heater being configured to modify the climate of the second section;
   a junction box in the first section, the junction box being configured to supply power from a power source to the first and second space heaters; and
   an electronic hygrostat on the wall and internal to the first section, the electronic hygrostat measuring a temperature and a humidity in the first section, the electronic hygrostat being configured to control the junction box to supply power from the power source to the first and/or second space heaters based on the temperature and the humidity of the first section.

* * * * *